United States Patent
Kumar et al.

(10) Patent No.: US 12,250,171 B2
(45) Date of Patent: Mar. 11, 2025

(54) OPPORTUNISTIC COHERENT AND NON-COHERENT COMBINING OF POSITIONING REFERENCE SIGNAL RESOURCES

(71) Applicant: QUALCOMM Incorporated, San Diego, CA (US)

(72) Inventors: Mukesh Kumar, Hyderabad (IN); Guttorm Ringstad Opshaug, Redwood City, CA (US); Siddhant, Bangalore (IN); Pulkit Rajgadiya, Churu (IN)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 17/510,701

(22) Filed: Oct. 26, 2021

(65) Prior Publication Data

US 2023/0126315 A1 Apr. 27, 2023

(51) Int. Cl.
| | |
|---|---|
| *H04L 5/00* | (2006.01) |
| *H04B 17/318* | (2015.01) |
| *H04W 56/00* | (2009.01) |
| *H04W 64/00* | (2009.01) |
| *H04W 72/53* | (2023.01) |

(52) U.S. Cl.
CPC ......... *H04L 5/0051* (2013.01); *H04B 17/318* (2015.01); *H04W 56/0055* (2013.01); *H04W 64/00* (2013.01); *H04W 72/53* (2023.01)

(58) Field of Classification Search
CPC ............................ H04B 17/318; H04W 72/53; H04W 56/0055; H04W 64/00
See application file for complete search history.

(56) References Cited

U.S. PATENT DOCUMENTS

| | | |
|---|---|---|
| 9,702,965 B2 | 7/2017 | Horvat et al. |
| 2017/0307723 A1 | 10/2017 | Edge et al. |
| 2022/0252690 A1* | 8/2022 | Zhou ..................... G01S 5/0244 |

FOREIGN PATENT DOCUMENTS

WO 2018093835 A1 5/2018

OTHER PUBLICATIONS

3GPP TS 37.355: "3 Generation Partnership Project, Technical Specification Group Radio Access Network, LTE Positioning Protocol (LPP) (Release 15)", 3rd Generation Partnership Project (3GPP), Mobile Competence Centre, 650, Route Des Lucioles, F-06921 Sophia-Antipolis Cedex, France, TS 37.355, vol. RAN WG2, No. V15.1.0, Jan. 6, 2021, pp. 1-224, The Whole Document.

(Continued)

*Primary Examiner* — Samina F Choudhry
(74) *Attorney, Agent, or Firm* — SUNSTEIN LLP/Qualcomm

(57) ABSTRACT

Techniques are provided for combining positioning reference signal (PRS) measurements coherently or non-coherently. An example method for combining positioning reference signal resources includes receiving a plurality of positioning reference signals associated with a positioning reference signal resource set or a transmission/reception point, coherently combining resource elements for two or more of the plurality of positioning reference signals received within a period of time, and non-coherently combining resource elements for two or more of the plurality of positioning reference signals received outside of the period of time.

12 Claims, 14 Drawing Sheets

(56) References Cited

OTHER PUBLICATIONS

International Search Report and Written Opinion—PCT/US2022/042352—ISA/EPO—Dec. 22, 2022.
Qualcomm Incorporated: "Enhancements on Timing Error Mitigations for Improved Accuracy", 3GPP TSG RAN WG1 #106-e, R1-2107345, 3rd Generation Partnership Project, Mobile Competence Centre, 650, Route Des Lucioles, F-06921, Sophia-Antipolis Cedex, France, vol. RAN WG1, No. e-Meeting, Aug. 16, 2021-Aug. 27, 2021, Aug. 6, 2021, 17 Pages, XP052038293, Section 3, p. 1.

\* cited by examiner

OPPORTUNISTIC COHERENT AND NON-COHERENT COMBINING OF POSITIONING REFERENCE SIGNAL RESOURCES

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (TDMA), Time Division Multiple Access (TDMA), the Global System for Mobile access (GSM) variation of TDMA, etc.

Obtaining the location (also referred to as a "position") of a mobile device that is accessing a wireless network may be useful for many applications including, for example, emergency calls, personal navigation, consumer asset tracking, locating a friend or family member, etc. Existing positioning methods include methods based on measuring radio signals transmitted from a variety of devices including space vehicles and terrestrial radio sources in a wireless network such as base stations and access points. Base stations in a wireless network may be configured to transmit reference signals to enable a mobile device to perform positioning measurements. Improvements in position related signaling may improve the accuracy, latency and/or efficiency of locating a mobile device.

SUMMARY

An example method for combining positioning reference signal resources according to the disclosure includes receiving a plurality of positioning reference signals associated with a positioning reference signal resource set or a transmission/reception point, coherently combining resource elements for two or more of the plurality of positioning reference signals received within a period of time, and non-coherently combining resource elements for two or more of the plurality of positioning reference signals received outside of the period of time.

Implementations of such a method may include one or more of the following features. Determining reference signal received power measurement value based on a combination of two or more of the plurality of positioning reference signals. Determining a position estimate based at least in part on the reference signal received power measurement value. Reporting the reference signal received power measurement value to a network server. Reporting one or more reference signal received power measurement values including a first reference signal received power measurement based on a single positioning reference signal or a second reference signal received power measurement based on a combination of two or more of the plurality of positioning reference signals.

An example method for combining positioning reference signal resources according to the disclosure includes receiving a plurality of positioning reference signals, wherein each of the plurality of positioning reference signals is associated with a timing error group, coherently combining resource elements for two or more of the plurality of positioning reference signals associated with a same timing error group, and non-coherently combining resource elements for two or more of the plurality of positioning reference signals associated with different timing error groups.

Implementations of such as method may include one or more of the following features. Determining a reference signal received power measurement value based on a combination of two or more of the plurality of positioning reference signals. Determining a position estimate based at least in part on the reference signal received power measurement value. Reporting the reference signal received power measurement value to a network server. Receiving assistance data indicating timing error group information for each of the plurality of positioning reference signals.

An example method of combining positioning reference signal resources according to the disclosure includes receiving assistance data including a plurality of positioning reference signal resources, determining two or more of the plurality of positioning reference signal resources to contribute to a combined signal measurement based at least in part on the assistance data, and obtaining a combined measurement value for two or more positioning reference signals.

Implementations of such a method may include one or more of the following features. The two or more positioning reference signals may be transmitted in a slot, and obtaining the combined measurement value may include a coherent combination of the two or more positioning reference signals. The two or more positioning reference signals may be associated with a timing error group, and obtaining the combined measurement value may include a coherent combination of the two or more positioning reference signals. The two or more positioning reference signals may be transmitted in different slots, and obtaining the combined measurement value may include a non-coherent combination of the two or more positioning reference signals. The two or more positioning reference signals may be associated with different timing error groups, and obtaining the combined measurement value includes a non-coherent combination of the two or more positioning reference signals. One or more measurement reports may be provided based at least in part on the combined measurement value. The two or more positioning reference signals may include a first positioning reference signal and a second positioning reference signal, and providing the one or more measurement reports may include providing a first report associated with the first positioning reference signal and a second report associated with the second positioning reference signal, such that both the first report and the second report include the combined measurement value. The two or more positioning reference signals may include a first positioning reference signal and a second positioning reference signal, and providing the one or more measurement reports may include providing a first report associated with the first positioning reference signal and a second report associated with the second positioning reference signal, such that the first report includes a first measurement value associated with the first positioning reference signal and the combined measurement value, and the second report includes a second measurement value associated with the second positioning reference signal and the combined measurement value. One or more measurement reports may include an indication that the combined measurement value is based on a coherent combination or a non-coherent combination of the two or more positioning reference signals. The method may include providing one or more capabilities messages to a network server indicating a number of positioning reference signal resources a wireless node is capable of combining. The assistance data may include an indication to combine positioning reference signal resources received from different positioning reference signal resource sets, different transmission/reception points, or different positioning frequency layers. The assistance data may include an indication of a maximum number of positioning reference signal resources to be combined within a positioning reference signal resource set, a transmission/reception point, or a positioning frequency layer.

An example method of providing assistance data to enable combining of positioning reference signals according to the disclosure includes determining two or more positioning reference signal resources to contribute to a combined positioning reference signal measurement, and providing the assistance data including an indication of the two or more positioning reference signal resources to contribute to the combined positioning reference signal measurement.

Implementations of such a method may include one or more of the following features. Determining the two or more positioning reference signal resources to contribute to the combined positioning reference signal measurement includes determining the two or more positioning reference signal resources are in a same slot. Determining the two or more positioning reference signal resources to contribute to the combined positioning reference signal measurement includes determining the two or more positioning reference signal resources are in a same timing error group. Receiving a measurement report indicating that the two or more positioning reference signal resources were not combined.

Items and/or techniques described herein may provide one or more of the following capabilities, as well as other capabilities not mentioned. A wireless network may utilize reference signal measurements to determine a position of a wireless node in the network. Positioning reference signals (PRS) may be used to enable user equipment (UEs) to detect and measure PRS transmitted from neighboring transmission/reception points (TRPS). A UE may be configured to obtain a signal measurement on a combination of received PRS. The combined measurement may increase the signal-to-noise ratio of the PRS and improve the accuracy of the resulting position estimate. The received PRS may be combined coherently or non-coherently. The UE may receive assistance data including information indicating which PRS may be combined, and whether the PRS will be combined coherently or non-coherently. The UE may report the combined PRS measurements to a location server. Other capabilities may be provided and not every implementation according to the disclosure must provide any, let alone all, of the capabilities discussed.

DETAILED DESCRIPTION

Techniques are discussed herein for combining positioning reference signal (PRS) measurements coherently or non-coherently. Wireless wide area networks (WWANs), such as LTE and 5G NR networks, may utilize various Orthogonal Frequency Division Multiplexing (OFDM) numerologies for transmitting reference signals and data. The resulting modulated multicarrier waveform may create a time/frequency grid of symbols and subcarriers. The symbols may be grouped in the time-domain to form slots, sub-frames, and radio frames to create a structure for mapping channels and signals for transmission. The subcarriers may be grouped into Physical Resource Blocks (PRBs) to provide a frequency domain structure. In NR, the term slot is used as the basic scheduling unit and each slot may comprise 12 subcarriers and 14 symbols. The slot duration in 5G NR may vary based on the frequency/subcarrier spacing (e.g., 1 ms to 0.06 ms).

Multiple PRS resources may be transmitted from a transmission/reception point (TRP) and received by wireless nodes, such as user equipment (UE) and reference location devices (RLDs), and other stations in a network. One or more PRS resources may be transmitted within a slot (i.e., intra slot PRS) or in different slots (i.e., inter slot PRS). In an example, the intra slot PRS may be coherently combined for a single Reference Signal Received Power (RSRP) measurement. The combined RSRP measurement may improve the signal to noise (SNR) gain by 3 dB as compare to measuring a single PRS. In an example, inter slot PRS may be combined non-coherently and may provide an improved SNR gain by 1.5-2 dB as compared to measuring a single PRS. In an example, the PRS resources may be associated with a timing error group (TEG) and the PRS resources associated with the same TEG may be combined coherently. PRS resources associated with different TEGs may be combined non-coherently. A wireless node may be configured to opportunistically combine PRS resources to improve positioning performance. The wireless node may be configured to report the combined results and/or report measurement values obtained for the PRS individually. In an example, a network resource such as a location server, may be configured to provide assistance data indicating PRS resources to be combined for generating the measurement results. A wireless node may be configure to provide indications to a network resource to describe capabilities for obtaining combined PRS measurements, and for reporting which PRS resources contribute to a combined PRS measurement value. Other signaling may also be used to enable network stations to combine and report the resulting PRS measurement values. These techniques and configurations are examples, and other techniques and configurations may be used.

Figure 1:
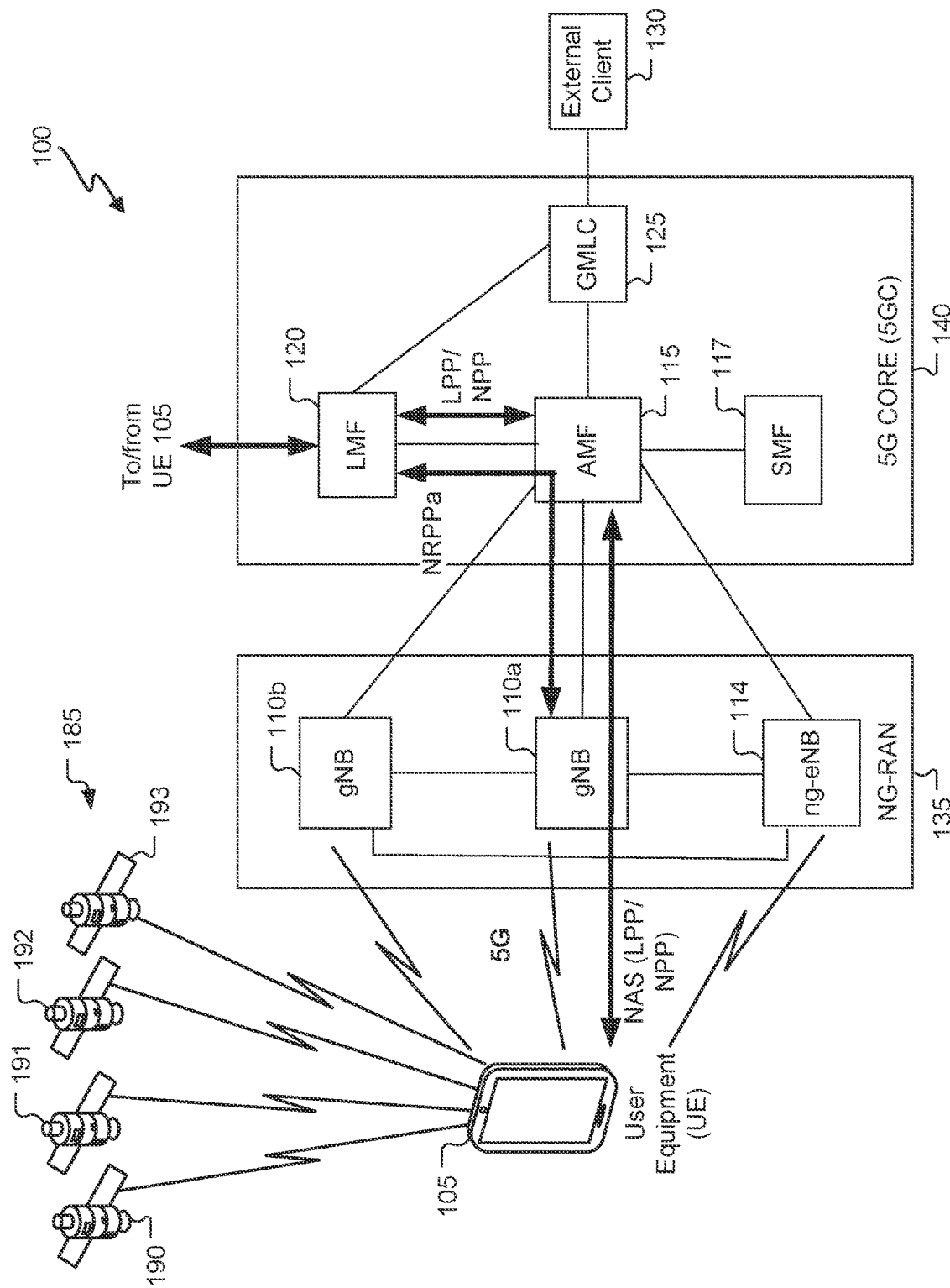
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). The NG-RAN 135 may be another type of RAN, e.g., a 3G RAN, a 4G Long Term Evolution (LTE) RAN, etc. The communication system 100 may utilize information from a constellation 185 of space vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WARS)). Additional components of the communication system 100 are described below. The communication system 100 may include additional or alternative components.

As shown in FIG. 1, the NG-RAN 135 includes NR NodeBs (gNBs) 110a, 110b, and a next generation eNodeB (ng-eNB) 114, and the 5GC 140 includes an Access and Mobility Management Function (AMF) 115, a Session Management Function (SW) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to hi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the LE 105 for such directionally-transmitted signals. The gateway mobile location center (GMLC)) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below around level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) the NG-RAN 135 shown in FIG. 1 include NR Node Bs, referred to as gNodeBs (gNBs) 110*a* and 100*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs, such as the gNB 110*a*, the gNB 110*b*, and the ng-eNB 114, may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and IMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 37.355. Here, LPP messages may be transferred between the UE 105 and the LMF 120 via the AMF 115 and the serving gNB 110a, 110b or the serving ng-eNB 114 for the UE 105. For example, LPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RST)), UE Receive-minus-Transmit Time Difference (Rx-Tx Time Difference), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, Rx-Tx Time Difference, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP message via the NG-RAN 135 and the 5GC 140.

An LPP message sent from the LMF 120 to the UE 105 may instruct the UE 105 to do any of a variety of things depending on desired functionality. For example, the LPP message could contain an instruction for the UE 105 to obtain measurements for GNSS (or A-GNSS), WLAN, E-CID, and/or OTDOA (or some other position method). In the case of E-CID, the LPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the IMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b,and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
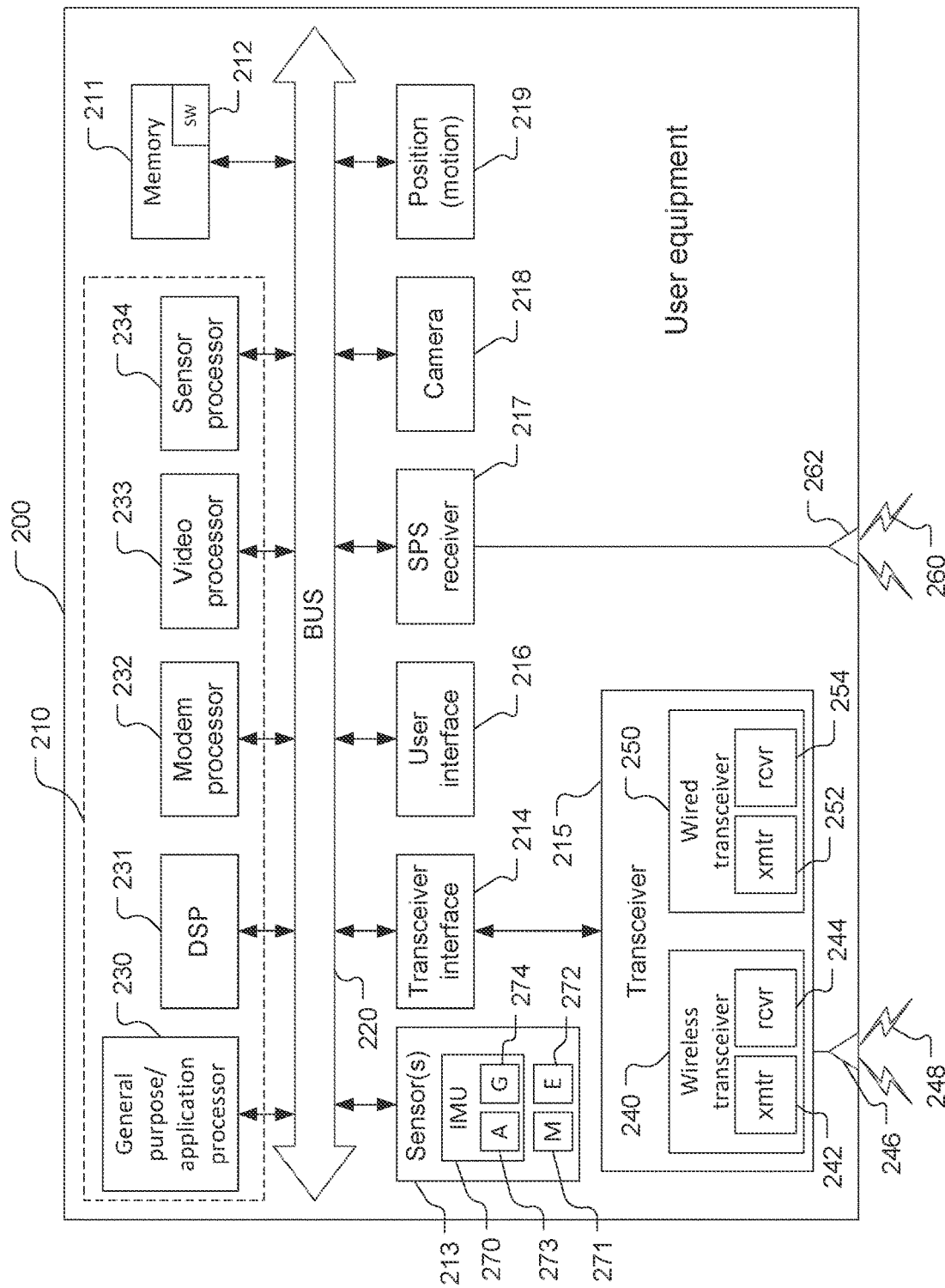
FIG. 2 is a block diagram of components of an example user equipment.

Referring also to FIG. 2, a UE 200 is an example of the UE 105 and comprises a computing platform including; a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory:, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensors) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/MU can be used to determine the angle and/or orientation of the other device with respect to the UE 200, etc.

The MU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110$a$, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3:
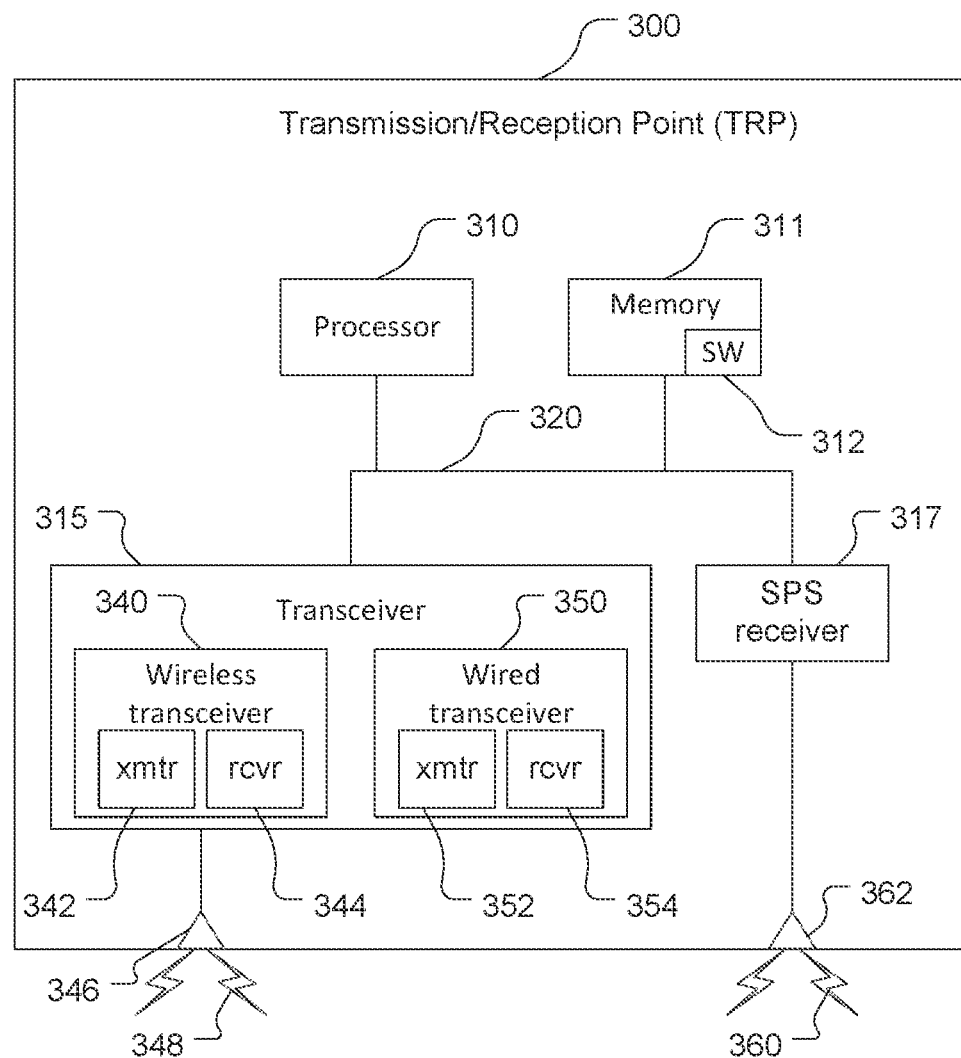
FIG. 3 is a block diagram of components of an example transmission/reception point.
Figure 4:
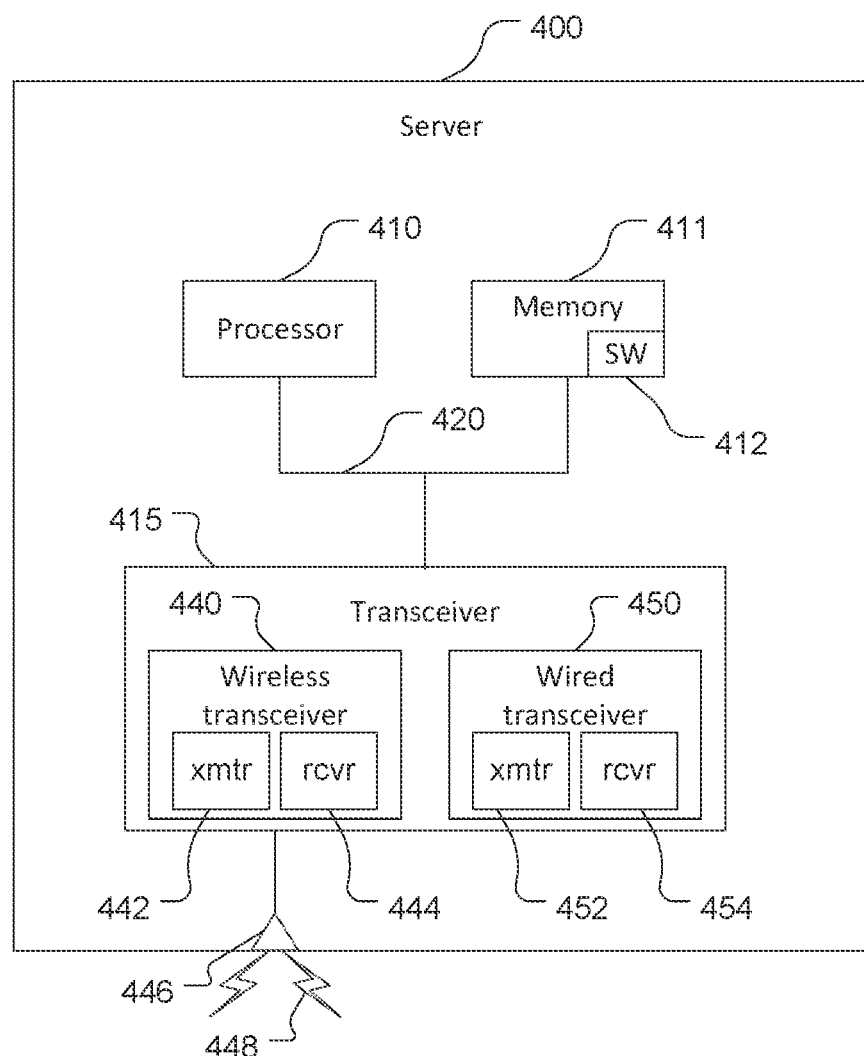
FIG. 4 is a block diagram of components of an example server.

Referring also to FIG. 3, an example of a TRP 300 of the gNB 110a, gNB 110b, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATS) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution). LTE Direct (LTE-D), 3GPP LTE-V2X (PC5), IEEE 802.11 (including IEEE 802.11p), WiFi, Direct (WiFi-D), Bluetooth®, Zigbee etc. The wired transceiver 350 may include a transmitter 352 and a receiver 354 configured for wired communication, e.g., with the core network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATS) such as 5G New Radio (NR), GSM (Global System for Mobiles), UMTS (Universal Mobile Telecommunications System), AMPS (Advanced Mobile Phone System). CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
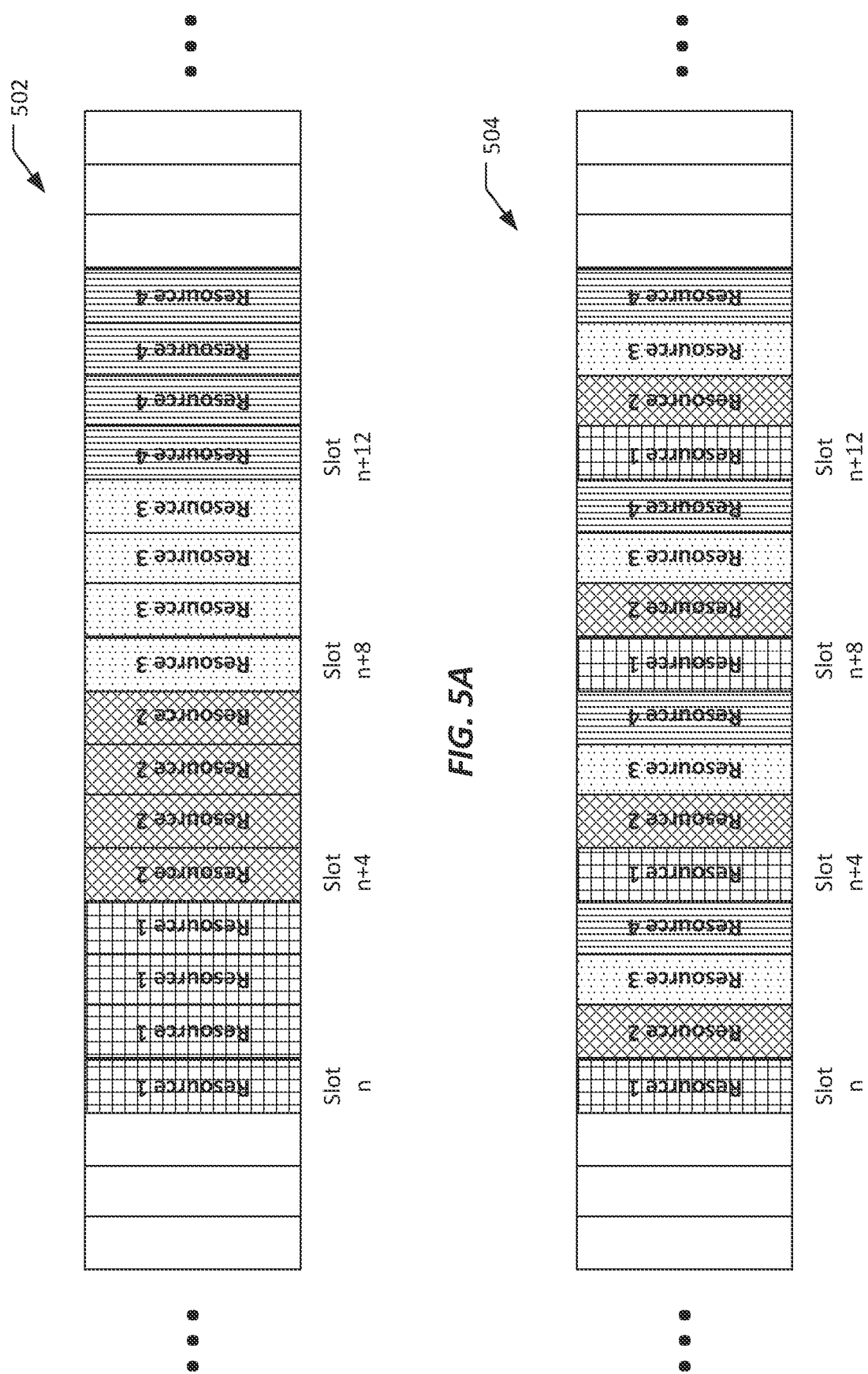
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The tune duration spanned by one PRS resource set containing repeated PRS resources does not exceed. PRS-periodicity. The repetition of a PRS resource enables receiver beam sweeping across repetitions and combining RF gains to increase coverage. The repetition may also enable intra-instance muting. A single instance of a PRS Resource Set as shown in FIG. 5A and FIG. 5B may also be referred to as a "PRS occasion".

Figure 6:
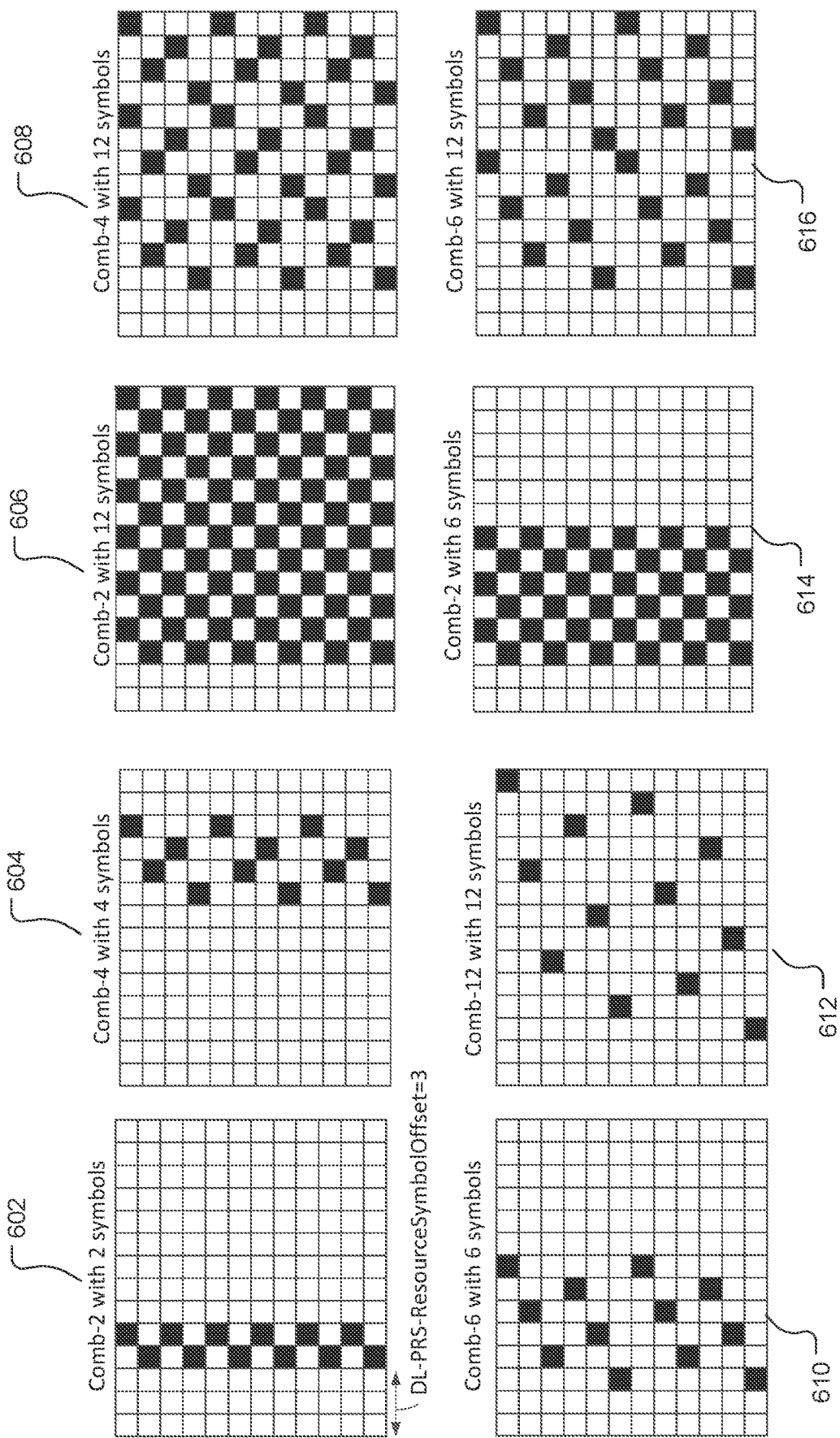
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. Typically, a base station may transmit the PRS from antenna port 5000 on one or more slots in each subframe configured for PRS transmission.

A base station may transmit the PRS over a particular PRS bandwidth, which may be configured by higher layers. A PRS Resource may be located anywhere in the frequency grid. A common reference point for the PRS may be defined as "PRS Point A". The "PRS Point A" may serve as a common reference point for the PRS resource block grid and may be represented by an Absolute Radio Frequency Channel Number (ARFCN). The PRS Start Physical Resource Block (PRB) may then be defined as a frequency offset between PRS Point A and the lowest subcarrier of the lowest PRS resource block expressed in units of resource blocks. The base station may transmit the PRS on subcarriers spaced apart across the PRS bandwidth.

The base station may also transmit the PRS based on the parameters such as PRS periodicity, PRS Resource Set Slot Offset, PRS Resource Slot Offset, PRS Resource Repetition Factor and PRS Resource Time Gap. PRS periodicity is the periodicity at which the PRS Resource is transmitted in number of slots. The PRS periodicity may depend on the subcarrier spacing (SCS) and may be, for example, $2^\mu \{4, 5, 8, 10, 16, 20, 32, 40, 64, 80, 160, 320, 640, 1280, 2560, 5120, 10240\}$ slots, with $\mu=0, 1, 2, 3$ for SCS 15, 30, 60, and 120 kHz, respectively. PRS Resource Set Slot Offset defines the slot offset with respect to System Frame Number (SFN)/Slot Number zero of the TRP (i.e., defines the slot where the first PRS Resource of the PRS Resource Set occurs). PRS Resource Slot Offset defines the starting slot of the PRS Resource with respect to the corresponding PRS Resource Set Slot Offset. PRS Resource Repetition Factor defines how many times each PRS Resource is repeated for a single instance of the PRS Resource Set, and PRS Resource Time Gap defines the offset in number of slots between two repeated instances of a PRS Resource within a single instance of the PRS Resource Set, as described above.

A PRS Resource may be muted. Muting may be signaled using a bit-map to indicate which configured PRS Resources are transmitted with zero-power (i.e., muted). In one option, the muting bit map may have a length of {2, 4, 6, 8, 16, 32} bits and muting is applied on each transmission instance of a PRS Resource Set. Each bit in the hit map may correspond to a configurable number of consecutive instances of a PRS Resource Set. All PRS Resources within a PRS Resource Set instance may be muted (transmitted with zero power) if the corresponding bit in the bit map indicates a '0'. The number of consecutive instances may be controlled by the parameter PRS Muting-Bit Repetition Factor, which may have the values {1, 2, 4, 8}. In another option, muting may be applied on each repetition of each of the PRS Resources. Each bit in the bit map may correspond to a single repetition of the PRS Resource within an instance of a PRS Resource Set. The length of the bit map may then be equal to the PRS Resource Repetition Factor.

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set may have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
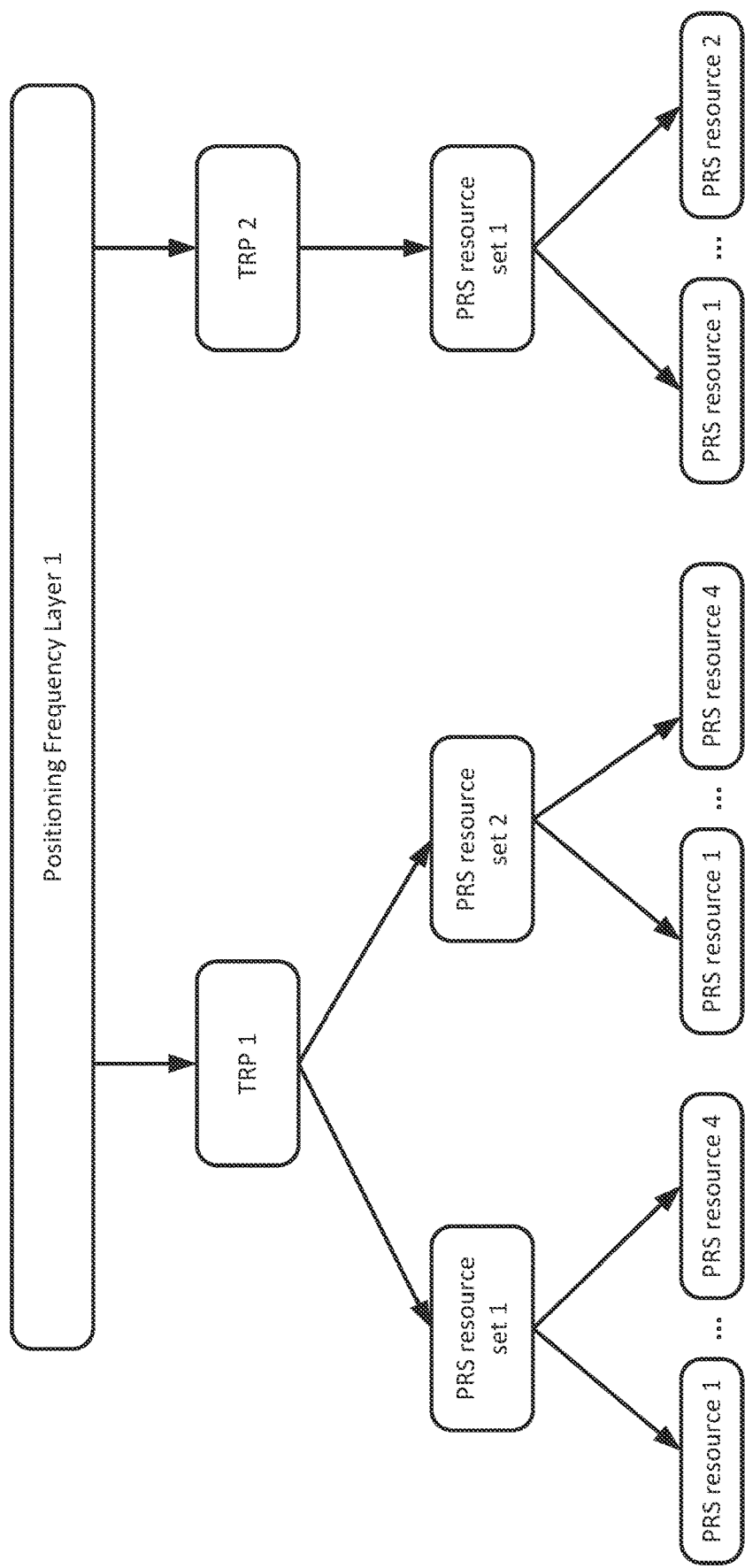
FIG. 7 is a diagram of an example positioning frequency layer.

Referring to FIG. 7, a conceptual diagram of an example positioning frequency layer 700 is shown. In an example, the positioning frequency layer 700 may be a collection of PRS resource sets across one or more TRPS. The positioning frequency layer may have the same subcarrier spacing (SCS) and cyclic prefix (CP) type, the same PRS Point-A, the same value of PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

If the PRS is transmitted by a TRP, the PRS may be referred to as DL-PRS; if the PRS is transmitted by a UE, the PRS may be referred to as UL-PRS. The UL-PRS may be based on SRS with enhancements for positioning purposes. The UL-PRS may also be referred to as "SRS for positioning". In some respects, the UL-PRS can be seen as the uplink equivalence to the DL-PRS.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may bet 2, 4, 6, 8, 12, 16, 24, 32, 48, 64 for each SCS: 15 kHz, 30 kHz, 60 kHz, 120 kHz.

Figure 8A:
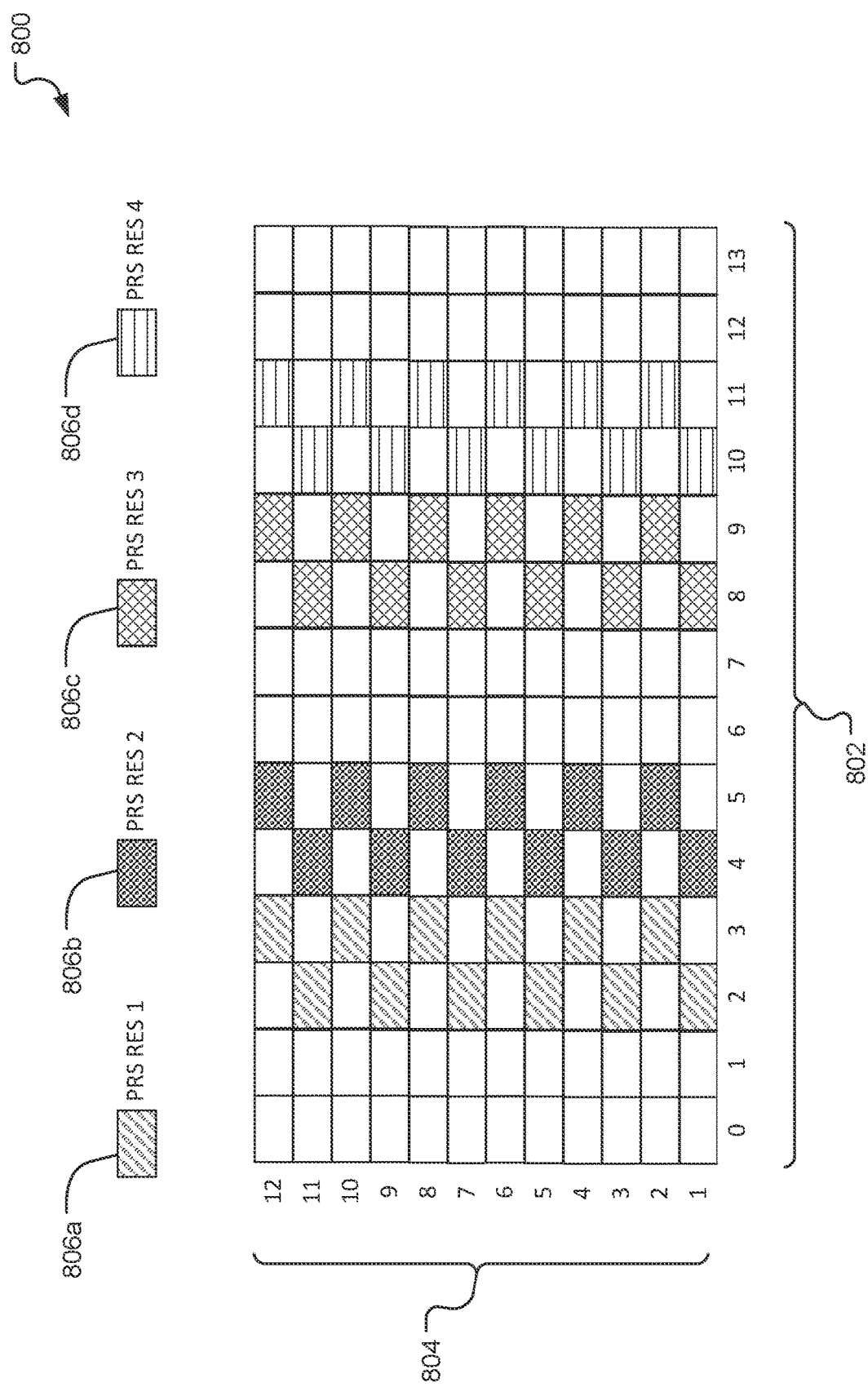
FIG. 8A is a diagram of a first example physical resource block with a plurality of positioning reference signal resources.

Referring to FIG. 8A, a first example physical resource block (PRB) 800 with a plurality of PRS resources is shown. The resource block 800 may include 168 resource elements (REs) configured as 14 symbols 802 and 12 sub-carriers 804. The PRB 800 may represent a slot in a 5G NR schema. In an example, four PRS resources including a first PRS 806a, a second PRS resource 806b, a third PRS resource 806c, and a fourth PRS resource 806d, include symbols within the PRB 800. Each of the PRS resources 806a-d is in a comb-2 with two symbols configuration. In an example, the PRS resources 806a-d may be within a PRS resource set, or transmitted by a single TRP. The PRS resources may be associated with a single TEG. A network server, such as the LMF 120, may provide assistance data including the PRS resources 806*a-d* and a wireless node such as the UE 200, may be configured to determine the relative locations of the REs associated with the PRS resources 806*a-d* and select a plurality of the PRS resources 806*a-d* for combined measurement. For example, the first and second PRS resources 806*a,* 806*b* may be coherently combined and measured as a comb-2 with 4 symbols. The first, second and third PRS resources 806*a,* 806*b.* 806*c* may be coherently combined and measured as a comb-2 with 6 symbols. All of the PRS resources 806*a-d* may be coherently combined and measured as a comb-2 with 8 symbols. The coherent combinations may improve the SNR gain by 3 dB as compared to measuring the PRS resources individually. The comb-2 with 2 symbol configuration of the PRS resources 806*a-d* are examples and not limitations. Referring to FIG. 6, other PRS resources with different comb and symbol structures may be combined. For example, a comb-2 with 2 symbols format 602 may be combined with a comb-4 with 4 symbols format 604, a comb-6 with 6 symbols format 610 may be combined with a comb-4 with 4 symbols format 604, or other combinations within a slot may be combined. In general, PRS resources which are transmitted coherently from the same TRP or in the same TEG (e.g., with the same phase) may be coherently combined with other PRS resources in the slot (i.e., when the RBs do not interfere with one another) to increase the SNR gain and improve the resulting measurement accuracy.

Figure 8B:
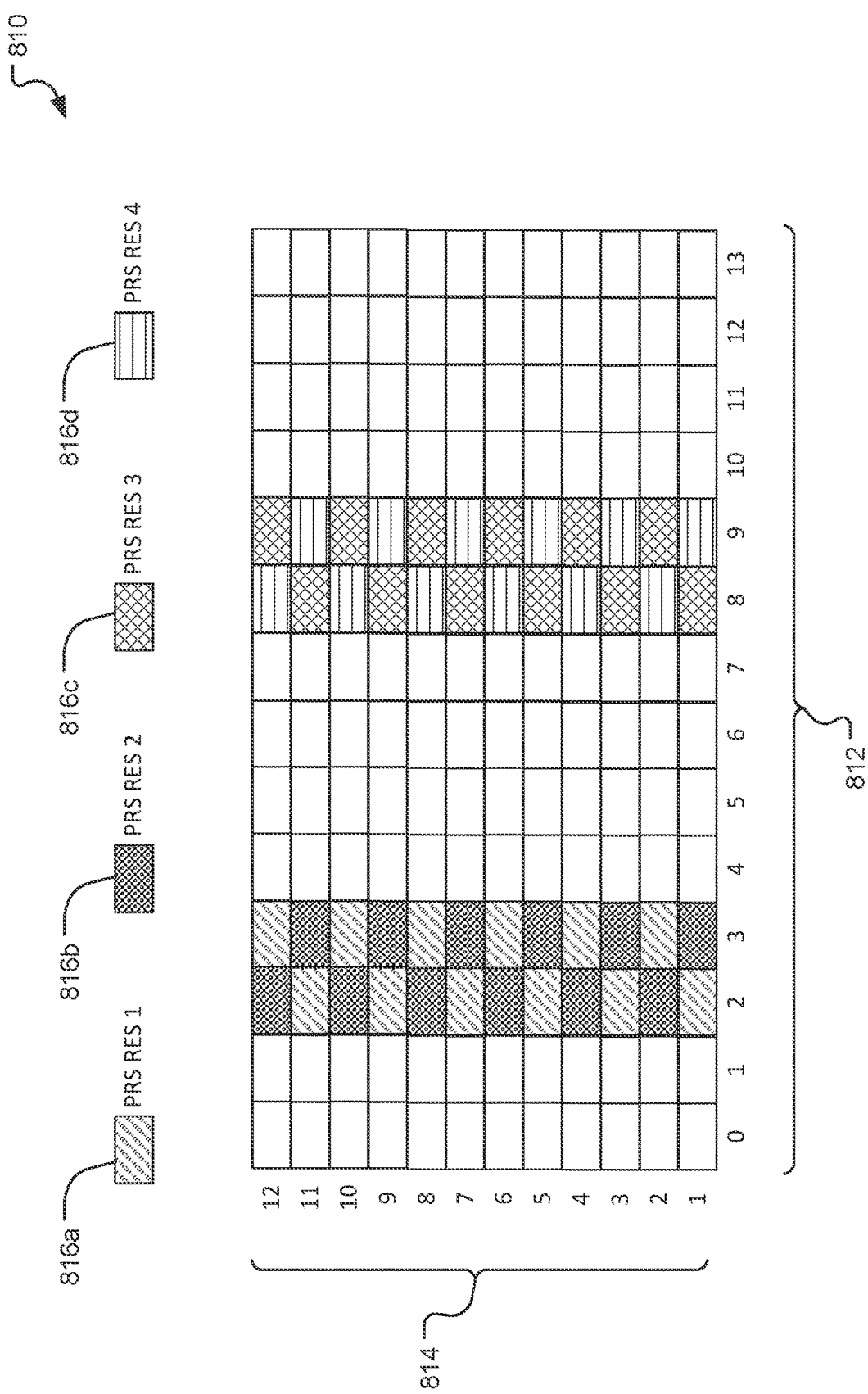
FIG. 8B is a diagram of a second example physical resource block with a plurality of positioning reference signal resources.

Referring to FIG. 8B, a second example PRB 810 with a plurality of PRS resources is shown. The resource block 810 include 168 resource elements (REs) configured as 14 symbols 812 and 12 sub-carriers 814. The PRB 810 may represent a slot in a 5G NR schema. Four PRS resources including a first PRS resource 816*a*, a second PRS resource 816*b*, a third PRS resource 816*c*, and a fourth PRS resource 816*d*, include symbols within the second example PRB 810. Each of the PRS resources 816*a-d* is in a comb-2 with two symbols configuration. In an example, the PRS resources 816*a-d* may be within a PRS resource set, or transmitted by a single TRP. The PRS resources 816*a-d* may be associated with a single TEG. In an example, the first and second PRS resources 816*a,* 816*b* may be coherently combined and measured as a comb-1 with 2 symbols. The third and fourth PRS resources 816*c,* 816*d* may be coherently combined and measured as a comb-1 with 2 symbols. All of the PRS resources 816*a-d* may be coherently combined and measured as a comb-1 with 4 symbols. The coherent combinations may improve the SNR gain by 3 dB as compared to measuring the PRS resources individually.

Figure 9:
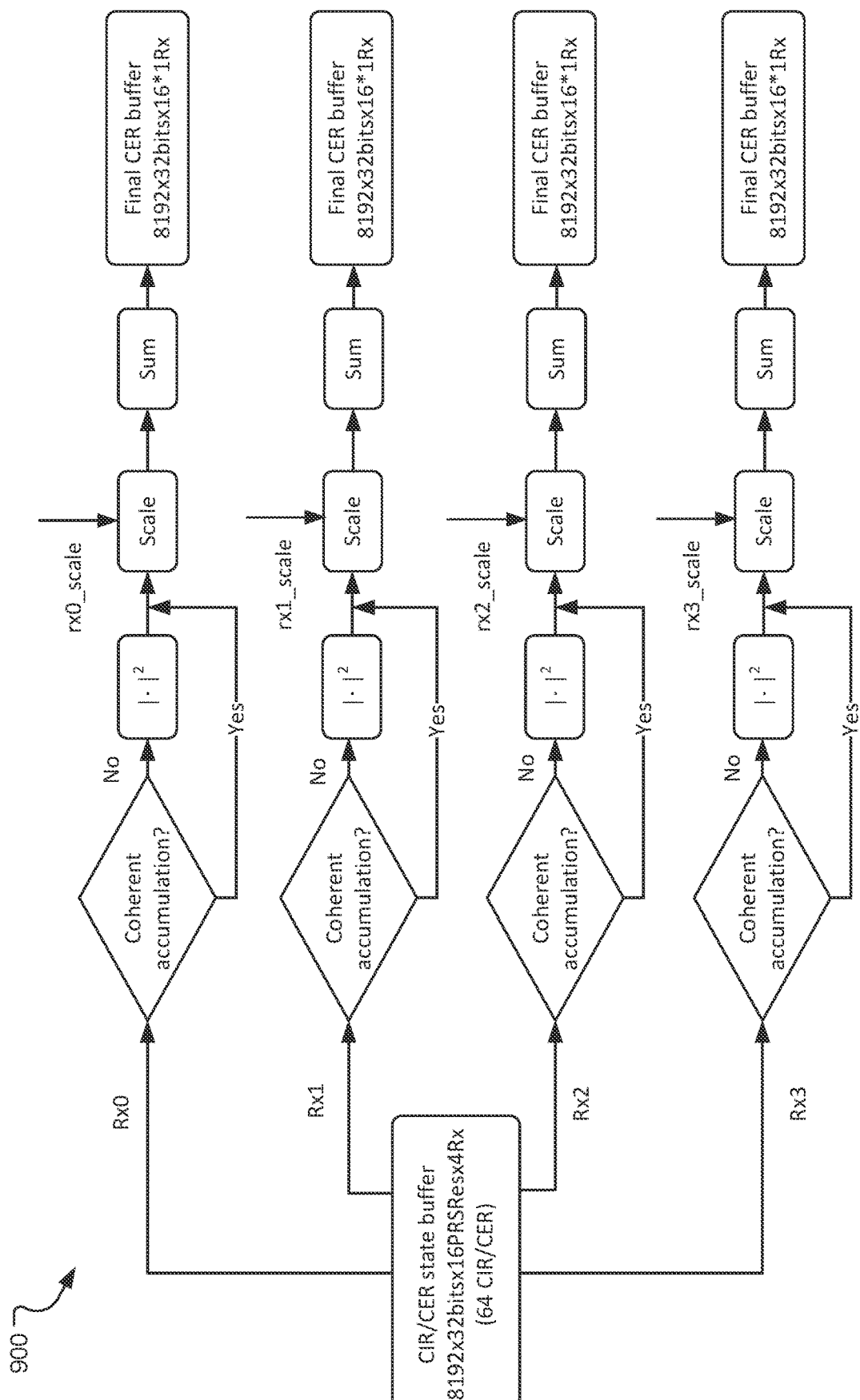
FIG. 9 is a block diagram of an example process for combining positioning reference signal measurement values.

Referring to FIG. 9, a block diagram of an example process 900 for combining positioning reference signal measurement values is shown. A UE 200, or other processing system, is a means for performing the process 900. The process 900 includes determining a channel impulse response (CIR), which is a vector of a complex number based on the results of an Inverse Fast Fourier Transform. Assistance data including PRS resource scheduling information may be utilized to determine if PRS resources are to be combined coherently or non-coherently. In general, PRS resources transmitted from the same TRP and/or in the same TEG may be combined coherently. Coherent combinations include a simple addition and may include some averaging. Non-coherent PRS resources are transformed to the magnitude domain by a squaring operation prior to addition and averaging. Doubling of PRS resources coherently may increase the SNR by 3 dB gain, and doubling non-coherent PRS resources may increase the SNR by 1.5 to 2 dB gain.

Figure 10:
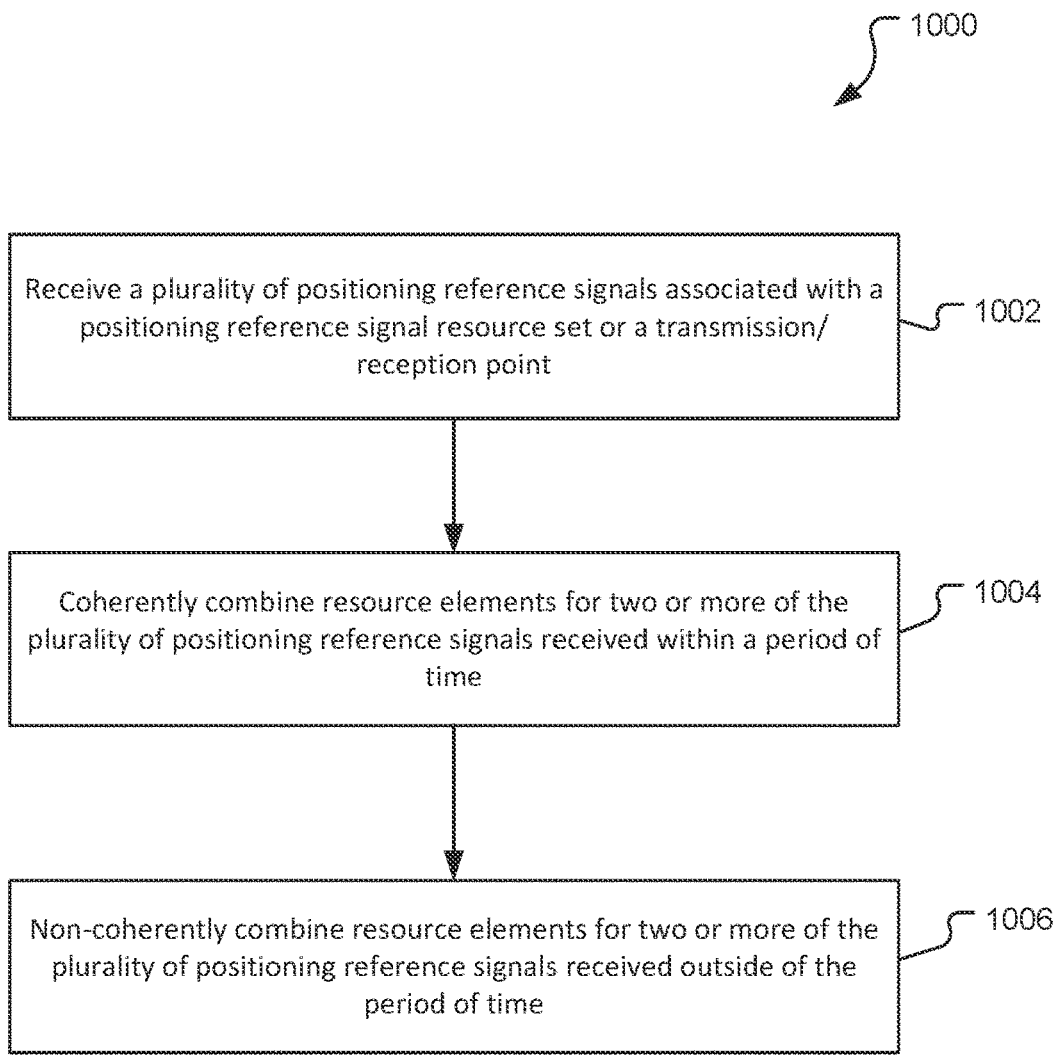
FIG. 10 is a process flow diagram for an example method for combining positioning reference signal measurements based at least in part on positioning reference signal resource set or transmission/reception point information.

Referring to FIG. 10, with further reference to FIGS. 1-9, a method 1000 for combining positioning reference signal measurements based at least in part on positioning reference signal resource set or transmission/reception point information includes the stages shown. The method 1000 is, however, an example and not limiting. The method 1000 may be altered, e.g., by having stages added, removed, rearranged, combined, performed concurrently, and/or having single stages split into multiple stages.

At stage 1002, the method includes receiving a plurality of positioning reference signals associated with a positioning reference signal resource set or a transmission/reception point. A UE 200, including a transceiver 215 and the processors 210, is a means for receiving the plurality of PRS. In an example, a network resource such as the LMF 120 may provide assistance data via LPP messages including PRS resource configuration information. The assistance data may be provided via other signaling methods such as System Information Blocks (SIBS) in Radio Resource Control (RRC) based messaging. For example, the PRS resource information may be based on a positioning frequency layer 700 such as depicted in FIG. 7. The PRS may be associated with a PRS resource set. In an example, the UE 200 may be configured with 2 PRS resource set per TRP 300. The PRS resources set from the same TRP 300 may have the same transmitting/physical location, and the PRS resources within the PRS resource set may be transmitted coherently or non-coherently. The assistance data may also include TEG information for the PRS resources. The PRS resources within the PRS resource set may have the same periodicity and slot offset, repetition factor, repetition gap and number of symbols. Each PRS resource within in the set may have its own slot symbol offset and comb structure. The UE 200 is configured to receive the PRS based on the assistance data and the corresponding PRS resource information.

At stage 1004, the method includes coherently combining resource elements for two or more of the plurality of positioning reference signals received within a period of time. The UE 200, including the transceiver 215 and the processors 210, is a means for coherently combining the RE for two or more of the plurality of PRS. In an example, the period of time may be defined by a slot in and OFDM numerology. The duration of a slot may vary based on the PRB bandwidth and a corresponding subcarrier spacing. In general, the period of time may be in the range of 0.06 ms to 1 ms. For example, referring to FIGS. 8A and 8B, the PRS resources 806*a-d,* 816*a-d* are received within a period of time (e.g., a slot duration in a 5G numerology scheme). The UE 200 may be configured to obtain PRS measurements such as DL RSTD, DL RSRP, and UE Rx-Tx time difference based on the combined positioning reference signals. The PRS measurements may be used to support positioning techniques such as DL-TDOA, DL-AoD, and Multi-RTT. The coherent combination of two PRS received in a slot (i.e., intra slot combination) may increase the SNR gain by 3 dB.

At stage 1006, the method includes non-coherently combining resource elements for two or more of the plurality of positioning reference signals received outside of the period of time. The UE 200, including the transceiver 215 and the processors 210, is a means for non-coherently combining the RE for two or more of the plurality of PRS. Non-coherent combination may be used for inter slot combinations (e.g., when the two PRS are received in different slots). For example, PRS resources from a PRS resource set or a TRP may be received in separate slots and may be separated by a time period that is greater than the slot duration. The separation of the PRS in the time domain may indicate that the PRS are not coherent (e.g., the phases are not the same). As depicted in FIG. 9, the non-coherent combination of the resource elements may include translating the CIR to the magnitude domain. The non-coherent combination of two PRS received outside the time period (i.e., inter slot combinations) may increase the SNR gain by 1.5 to 2 dB.

In an example, the UE 200 may be configured to send one or more measurement report messages to the LMF 120 via LPP or other messaging protocols. The measurement reports may include RSRP for the PRS resources. The UE 200 may be configured to obtain and report a first power measurement (X1) based on a first PRS resource (PRS1), a second power measurement (X2) based on a second PRS resource (PRS2), and/or a third power measurement (X3) based on a combination of the first and second PRR resources PRS1 and PRS2). In an example, the UE 200 may report one or more of the measurement values (e.g., X1, X2, X3) and the corresponding PRS resource information in a single measurement report. In an example, the UE 200 may be configured to report the best value highest RSRP) of X1, X2, or X3.

Figure 11:
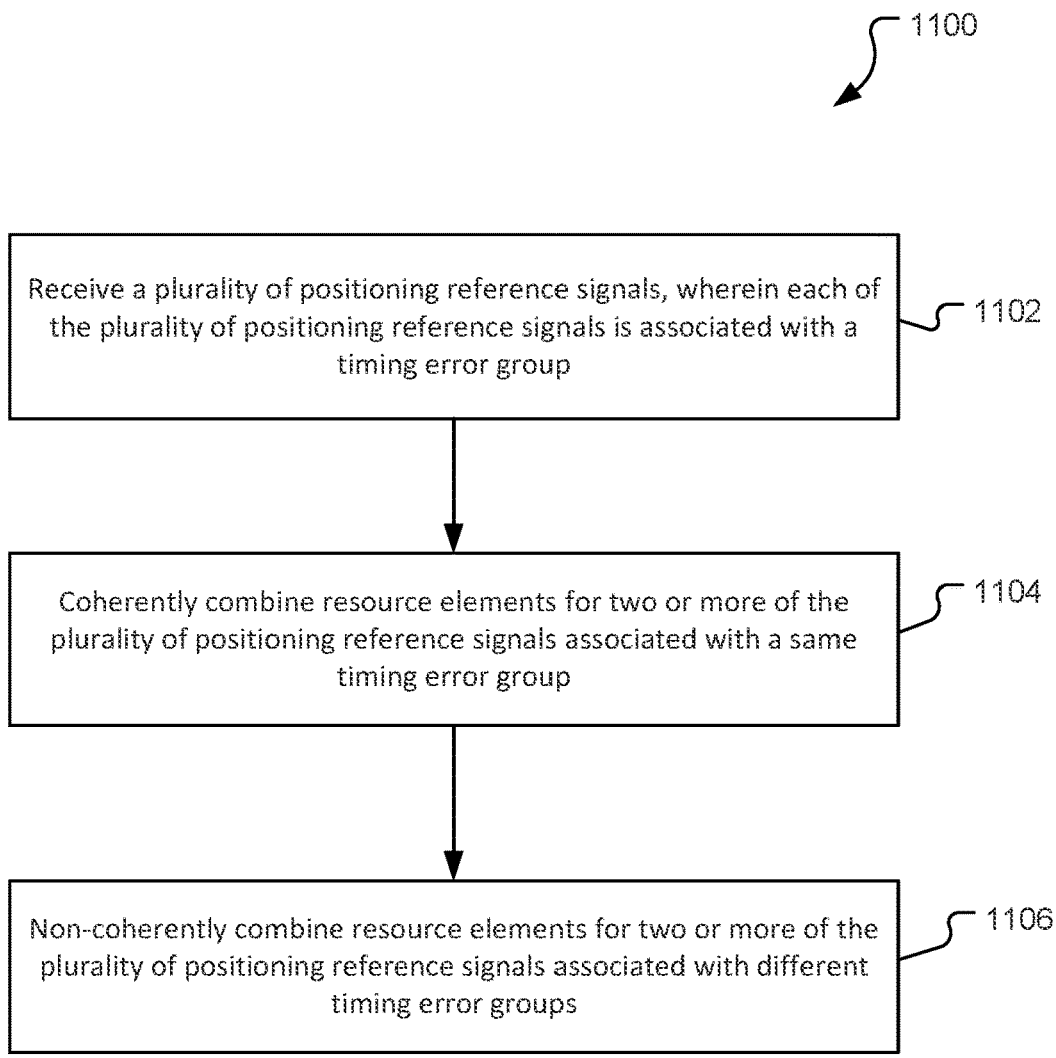
FIG. 11 is a process flow diagram for an example method of combining positioning reference signal measurements based at least in part on timing error group information.

Referring to FIG. 11, with further reference to FIGS. 1-9, a method 1100 for combining positioning reference signal measurements based at least in part on timing error group information includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes receiving a plurality of positioning reference signals, wherein each of the plurality of positioning reference signals is associated with a timing error group (TEG). A UE 200, including a transceiver 215 and the processors 210, is a means for receiving the plurality of PRS. In an example, a network resource such as the LMF 120 may provide assistance data via LPP messages including PRS resource configuration information. The assistance data may be provided via other signaling methods such as System Information Blocks (SIBS) in Radio Resource Control (RRC) based messaging. The assistance data may include an indication of a TEG for each of the PRS resources. The TEG information may be based on the TX and RX timing errors associated with one or more reference signal resources, such as DL PRS resources. The TEG information associated with the PRS resources may be used to indicate that two or more of the PRS resources are transmitted coherently when the PRS resources belong to the same TEG. The UE 200 is configured to receive the PRS based on the assistance data and the corresponding PRS resource information.

At stage 1104, the method includes coherently combining resource elements for two or more of the plurality of positioning reference signals associated with a same timing error group. The UE 200, including the transceiver 215 and the processors 210, is a means for coherently combining the RE for two or more of the plurality of PRS. In an example, the TEG information may be used to indicate the PRS resources will be transmitted coherently, and the UE 200 may be configured to obtain PRS measurements such as DL RSTD, DL RSRP, and UE Rx-Tx time difference based on the coherent combinations of the PRS. The PRS measurements may be used to support positioning techniques such as DL-TDOA, DL-AoD, and Multi-RTT. The coherent combination of two PRS received in a slot intra slot combination) may increase the SNR gain by 3 dB.

At stage 1106, the method includes non-coherently combining resource elements for two or more of the plurality of positioning reference signals associated with the different tuning error groups. The UE 200, including the transceiver 215 and the processors 210, is a means for non-coherently combining the RE for two or more of the plurality of PRS. The indication that PRS resources are in different TEGs may indicate that the PRS are transmitted non-coherently (e.g., the phases are not the same). For example, PRS resources from the same or different TRPs and/or resource sets may utilize different transmit chains or are transmitted at different times and thus associated with different TEGs. The non-coherent combination of two PRS associated with different TEGs may increase the SNR gain by 1.5 to 2 dB.

Figure 12:
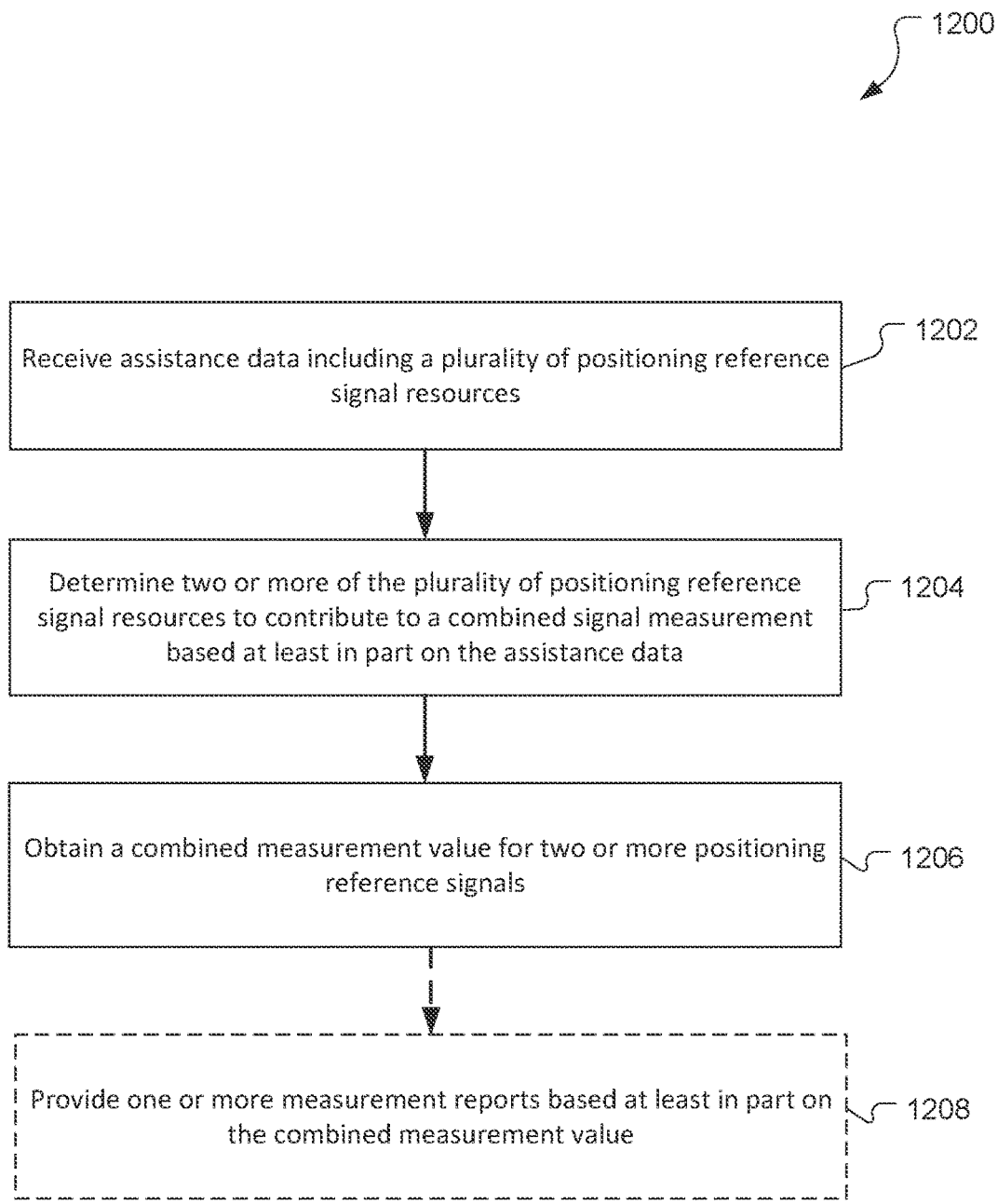
FIG. 12 is a process flow for an example method for obtaining combined positioning reference signal measurements.

Referring to FIG. 12, with further reference to FIGS. 1-9, a method 1200 for obtaining combined positioning reference signal measurements includes the stages shown. The method 1200 is, however, an example and not limiting. The method 1200 may be altered, having stages added, removed, rearranged, combined, performed concurrently, and/or having single stages split into multiple stages. For example, providing measurement reports at stage 1208 is optional.

At stage 1202, the method includes receiving assistance data including a plurality of reference signal resources. A UE 200, including a transceiver 215 and the processors 210, is a means for receiving the assistance data. In an example, a network resource such as the LMF 120 may provide assistance data via LPP messages including PRS resource configuration information. The assistance data may be provided via other signaling methods such as SIBs in RRC based messaging. The PRS resource information in the assistance data may include a common reference point for a PRS resource block grid and may be represented by an ARFCN. The PRS Start PRB may then be defined as a frequency offset between the common reference point and the lowest subcarrier of the lowest PRS resource block expressed in units of resource blocks. The assistance data may also include other PRS based parameters such as PRS periodicity, PRS Resource Set Slot Offset, PRS Resource Slot Offset, PRS Resource Repetition Factor and PRS Resource Time Gap. PRS periodicity is the periodicity at which the PRS Resource is transmitted in a number of slots. The PRS periodicity may depend on the subcarrier spacing. PRS Resource Set Slot Offset defines the slot offset with respect to System Frame Number (SFN)/Slot Number zero of the TRP (i.e., defines the slot where the first PRS Resource of the PRS Resource Set occurs). PRS Resource Slot Offset defines the starting slot of the PRS Resource with respect to the corresponding PRS Resource Set Slot Offset. PRS Resource Repetition Factor defines how many times each PRS Resource is repeated for a single instance of the PRS Resource Set, and PRS Resource Time Gap defines the offset in a number of slots between two repeated instances of a PRS Resource within a single instance of the PRS Resource Set. The assistance data may also include TEG information for each of the PRS resources.

In an example, the UE 200 may be configured to provide one or more capabilities messages to a network server to provide an indication of a capability to combine PRS resources. For example, the UE 200 may provide capability information to the LMF 120 indicating how many PRS resources the UE 200 may combine coherently and non-coherently, a maximum number resources per PRS resource set, a maximum resources per TRP, and/or a maximum resources per PFL. The assistance data may include an indication to combine PRS resources from different PRS resource sets, transmission/reception points, and different positioning frequency layers (PFLs).

At stage 1204, the method includes determining two or more of the plurality of positioning reference signal resources to contribute to a combined signal measurement based at least in part on the assistance data. The UE 200, including the transceiver 215 and the processors 210, is a means for determining two or more PRS to contribute to a combined signal measurement. UE 200 may be configured to utilize the assistance data received at stage 1202 to opportunistically combine PRS measurements to improve SNR and positioning performance. For example, referring to FIGS. 8A and 8B, the UE 200 may determine that PRS resources from the same PRS resource set, within a TRP, or associated with the same TEG, which will be received in the same slot may be coherently combined. Similarly, PRS resources from the same PRS resource set, within a TRP, or associated with different TEGs, which will be received in different slots may be non-coherently combined. PRS received in the same slot and associated with different TEGs may also be non-coherently combined.

At stage 1206, the method includes obtaining a combined measurement value for two or more positioning reference signals. The UE 200, including the transceiver 215 and the processors 210, is a means for obtaining the combined measurements. The UE 200 may be configured to obtain PRS measurements such as DL RSTD, DL RSRP, and UE Rx-Tx time difference based on the combinations of RB in the PRS resources determined at stage 1204. For example, referring to FIGS. 8A and 8B, the UE 200 may be configured to combine multiple PRS resources (e.g., 2, 3, 4, etc.) in a single PRS measurement. The combined PRS measurements may be used to support positioning techniques such as DL-TDOA, DL-AoD, and Multi-RTT. In a UE based positioning technique, the UE 200 may be configured to utilize the resulting PRS measurements to determine a position estimate.

At stage 1208, the method optionally includes providing one or more measurement reports based at least in part on the combined measurement value. The UE 200, including the transceiver 215 and the processors 210, is a means for providing the one or more measurement reports. In a UE assisted mode, the UE 200 may provide one or more reporting messages to a location server, such as the LMF 120. The measurement reports may utilize LPP messaging, or other signaling techniques such as RRC based messaging. In an example, the UE 200 may be configured to combine the PRS measurements across different combinations of PRS resources and send the combined PRS measurement in each of the PRS resources which contributed to the measurement. For example, the UE 200 may combine PRS resource X and Y and then may send individual results for X and Y, or send combined results of X and Y for both X and Y, or send a combination of combined and individual measurement results. In an example, the UE 200 may be configured to provide additional information on the PRS resources that contributed to a combined measurement. For example, the UE 200 may be configured to provide an indication on whether the PRS resources were coherently or non-coherently combined. The UE 200 may be configured to provide details of the PRS resources the UE 200 combined in one or more measurement reports. The UE 200 may combine a fewer number of resources as compared to an amount requested by the LMF 120. For example, the LMF 120 may request the UE 200 to combine 4 resources, but UE 200 may be configured to only combine 2 resources. The UE 200 may provide an indication that only two resources were combined. In an example, the 200 may be configured to provide indications on whether resources are coherently or non-coherently combined, such as which resources are combined coherently and non-coherently, or based on a mixed combination. In an example, the UE 200 may be configured to an indication of combining capabilities to the LMF 120. For example, the indication may indication how many PRS resources the UE 200 may combine coherently and non-coherently. The indication may be based on different numbers of resources that may be combined, such as a maximum resources per PRS resource set, a maximum resources per TRP, and/or a maximum resources per PFL.

Figure 13:
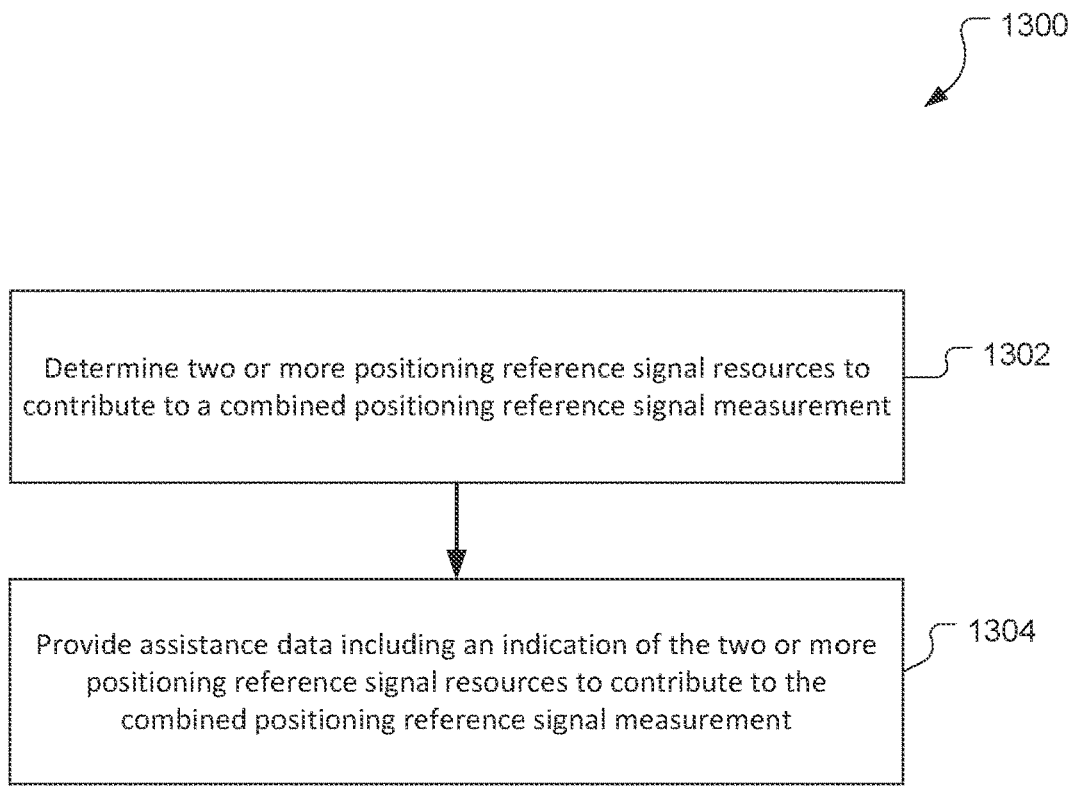
FIG. 13 is a process flow for an example method for providing assistance data including information to enable combining of positioning reference signal measurements.

Referring to FIG. 13, with further reference to FIGS. 1-9, a method 1300 for providing assistance data including information to enable combining of positioning reference signal measurements includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes determining two or more positioning reference signals to contribute to a combined positioning reference signal measurement. A server 400, such as the IMF 120, including a processor 410 and a transceiver 415 is a means for determining two or more PRSs to contribute to a combined PRS measurement. In an example, the LMF 120 may be configured to determine the PRS resources that a wireless node (e.g., UE) may received based on a coarse location of the wireless node. The coarse location may be based on mobility tracking information or the results of previous positioning occasions. In an example, referring to FIGS. 8A and 8B, the LMF 120 may analyze the PRS resource configurations to determine that the PRS resources from a PRS resource set, within a TRP, or associated with the same TEG, which will be received by a wireless node in the same slot may be coherently combined. Similarly, the LMF 120 may determine that PRS resources from the same PRS resource set, within a TRP, or associated with different TEGs, which will be received by the wireless node in different slots may be non-coherently combined. PRS received in the same slot and associated with different TEGs may also be non-coherently combined. The LMF 120 is configured to generate assistance data based on the analysis of the PRS resources.

In an example, the assistance data generated by the LMF 120 may provide the wireless node an indication of the PRS resources the wireless node should combined for generating measurement results. The assistance data may indicate PRS resources for inter PRS resource set combining, for intra PRS resource set combining, for both inter and intra PRS resource set combining, or an indication not to combine PRS resources. In an example, the assistance data may instruct the wireless node to combine PRS resources across TRP's, and/or provide an indication of one or more TEGs to utilize for coherent and non-coherent combining. In an example, the assistance data may include an indication of a maximum number of PRS resources to be combined by a wireless node within a PRS resource set and/or TRP. The assistance data may include other parameters to assist a wireless node (e.g., UE) to obtain and combine PRS resources. In an example, other messages (e.g., in addition to the assistance data) may be used to provide information to enable a wireless node to measure combined PRS resources.

At stage 1304, the method includes providing assistance data including an indication of the two or more positioning reference signal resources to contribute to the combined positioning reference signal measurement. The server 400, including the processor 410 and the transceiver 415, is a means for providing the assistance data. In an example, the LMF 120 may provide the assistance data via LPP messages including PRS resource configuration information and the indication of the one or more positioning reference signal resources to contribute to the combined positioning reference signal measurement. The assistance data may be provided via other signaling methods such as SIBS in RRC based messaging. In an example, the LMF 120 may provide the assistance data to one or more TRPs (e.g., gNB 110a, gNB 110b, ng-eNB 114) to enable the TRPs to measure combined PRS and/or provide the assistance data to other wireless nodes in the network. The assistance data may include an indication to combine PRS resources from different PRS resource sets, transmission/reception points, and different positioning frequency layers (PFLs). In an example, the LMF 120 may provide instructions in the assistance data regarding which and/or how the PRS resources should be combined. The assistance data may request both individual and combined results, or only combined results. In some use cases, a UE may not be able to combine the PRS resources because of timeline issues or other high priority task requirements in the UE. In such as use case, the UE may be configured to report the individual resource results if available, even if LMF 120 requested combined results, and the UE may also indicate that the results are not combined results.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure) As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for combining positioning reference signal resources, comprising:
receiving a plurality of positioning reference signals associated with a positioning reference signal resource set or a transmission/reception point;
coherently combining resource elements for two or more of the plurality of positioning reference signals received within a period of time; and
non-coherently combining resource elements for two or more of the plurality of positioning reference signals received outside of the period of time.

Clause 2. The method of clause 1 further comprising determining a reference signal received power measurement value based on a combination of two or more of the plurality of positioning reference signals.

Clause 3. The method of clause 2 further comprising determining a position estimate based at least in part on the reference signal received power measurement value.

Clause 4. The method of clause 2 further comprising reporting the reference signal received power measurement value to a network server.

Clause 5. The method of clause 1 further comprising reporting one or more reference signal received power measurement values including a first reference signal received power measurement based on a single positioning reference signal or a second reference signal received power measurement based on a combination of two or more of the plurality of positioning reference signals.

Clause 6. The method of clause 1 further comprising receiving assistance data indicating two or more positioning reference signals to combine.

Clause 7. The method of clause 1 wherein the period of time is equal to a duration of a slot in a fifth generation numerology scheme.

Clause 8. The method of clause 7 wherein the two or more of the plurality of positioning reference signals received within the period of time are received in a same slot.

Clause 9. The method of clause 7 wherein the two or more of the plurality of positioning reference signals received within the period of time are received in different slots.

Clause 10. The method of clause 7 wherein the two or more of the plurality of positioning reference signals received outside the period of time are received in different slots.

Clause 11. A method for combining positioning reference signal resources, comprising:
receiving a plurality of positioning reference signals, wherein each of the plurality of positioning reference signals is associated with a timing error group;
coherently combining resource elements for two or more of the plurality of positioning reference signals associated with a same timing error group; and
non-coherently combining resource elements for two or more of the plurality of positioning reference signals associated with different timing error groups.

Clause 12. The method of clause 11 further comprising determining a reference signal received power measurement value based on a combination of two or more of the plurality of positioning reference signals.

Clause 13. The method of clause 12 further comprising determining a position estimate based at least in part on the reference signal received power measurement value.

Clause 14, The method of clause 12 further comprising reporting the reference signal received power measurement value to a network server.

Clause 15. The method of clause 11 further comprising receiving assistance data indicating timing error group information for each of the plurality of positioning reference signals.

Clause 16. A method of combining positioning reference signal resources, comprising:
receiving assistance data including a plurality of positioning reference signal resources;
determining two or more of the plurality of positioning reference signal resources to contribute to a combined signal measurement based at least in part on the assistance data; and
obtaining a combined measurement value for two or more positioning reference signals.

Clause 17. The method of clause 16 wherein the two or more positioning reference signals are transmitted in a slot, and obtaining the combined measurement value includes a coherent combination of the two or more positioning reference signals.

Clause 18, The method of clause 16 wherein the two or more positioning; reference signals are associated with a timing error group, and obtaining the combined measurement value includes a coherent combination of the two or more positioning reference signals.

Clause 19. The method of clause 16 wherein the two or more positioning reference signals are transmitted in different slots, and obtaining the combined measurement value includes a non-coherent combination of the two or more positioning reference signals.

Clause 20. The method of clause 16 wherein the two or more positioning reference signals are associated with different timing error groups, and obtaining the combined measurement value includes a non-coherent combination of the two or more positioning reference signals.

Clause 21. The method of clause 16 wherein the combined measurement value is reference signal received power measurement value based on the two or more positioning reference signals.

Clause 22. The method of clause 16 further comprising providing one or more measurement reports based at least in part on the combined measurement value.

Clause 23, The method of clause 22 wherein the two or more positioning reference signals includes a first positioning reference signal and a second positioning reference signal, and providing the one or more measurement reports includes providing a first report associated with the first positioning reference signal and a second report associated with the second positioning reference signal, wherein both the first report and the second report include the combined measurement value.

Clause 24. The method of clause 22 wherein the two or more positioning reference signals includes a first positioning reference signal and a second positioning reference signal, and providing the one or more measurement reports includes providing a first report associated with the first positioning reference signal and a second report associated with the second positioning reference signal, wherein the first report includes a first measurement value associated with the first positioning reference signal and the combined measurement value, and the second report includes a second measurement value associated with the second positioning reference signal and the combined measurement value.

Clause 25. The method of clause 22 wherein the one or more measurement reports includes an indication that the combined measurement value is based on a coherent combination or a non-coherent combination of the two or more positioning reference signals.

Clause 26. The method of clause 16 further comprising providing one or more capabilities messages to a network server indicating a number of positioning reference signal resources a wireless node is capable of combining.

Clause 27. The method of clause 16 wherein the assistance data includes an indication to combine positioning reference signal resources received from different positioning reference signal resource sets, different transmission/reception points, or different positioning frequency layers.

Clause 28. The method of clause 16 wherein the assistance data includes an indication of one or more timing error groups and determining the two or more of the plurality of positioning reference signal resources to contribute to the combined signal measurement is based at least in part on the indication of one or more timing error groups.

Clause 29. The method of clause 16 wherein the assistance data includes an indication of a maximum number of positioning reference signal resources to be combined within a positioning reference signal resource set, a transmission/reception point, or a positioning frequency layer.

Clause 30. A method of providing assistance data to enable combining of positioning reference signals, comprising:
determining two or more positioning reference signal resources to contribute to a combined positioning reference signal measurement; and
providing the assistance data including an indication of the two or more positioning reference signal resources to contribute to the combined positioning reference signal measurement.

Clause 31. The method of clause 30 wherein determining the two or more positioning reference signal resources to contribute to the combined positioning reference signal measurement includes determining the two or more positioning reference signal resources are in a same slot.

Clause 32. The method of clause 30 wherein determining the two or more positioning reference signal resources to contribute to the combined positioning reference signal measurement includes determining the two or more positioning reference signal resources are in different slots.

Clause 33. The method of clause 30 wherein determining the two or more positioning reference signal resources to contribute to the combined positioning reference signal measurement includes determining the two or more positioning reference signal resources are in a same timing error group.

Clause 34. The method of clause 30 wherein determining the two or more positioning reference signal resources to contribute to the combined positioning reference signal measurement includes determining the two or more positioning reference signal resources are in different timing error groups.

Clause 35. The method of clause 30 further comprising receiving a measurement report indicating that the two or more positioning reference signal resources were not combined.

Clause 36. An apparatus, comprising:
a memory;
at least one transceiver;
at least one processor communicatively coupled to the memory and the at least one transceiver, and configured to:
receive a plurality of positioning reference signals associated with a positioning reference signal resource set or a transmission/reception point;
coherently combine resource elements for two or more of the plurality of positioning reference signals received within a period of time; and
non-coherently combine resource elements for two or more of the plurality of positioning reference signals received outside of the period of time.

Clause 37. The apparatus of clause 36 wherein the at least one processor is further configured to determine a reference signal received power measurement value based on a combination of two or more of the plurality of positioning reference signals.

Clause 38. The apparatus of clause 37 wherein the at least one processor is further configured to determine a position estimate based at least in part on the reference signal received power measurement value.

Clause 39. The apparatus of clause 37 wherein the at least one processor is further configured to report the reference signal received power measurement value to a network server.

Clause 40. The apparatus of clause 36 wherein the at least one processor is further configured to report one or more reference signal received power measurement values including a first reference signal received power measurement based on a single positioning reference signal or a second reference signal received power measurement based on a combination of two or more of the plurality of positioning reference signals.

Clause 41. The apparatus of clause 36 wherein the at least one processor is further configured to receive assistance data indicating two or more positioning reference signals to combine.

Clause 42. The apparatus of clause 36 wherein the period of time is equal to a duration of a slot in a fifth generation numerology scheme.

Clause 43. The apparatus of clause 42 wherein the two or inure of the plurality of positioning reference signals received within the period of time are received in a same slot.

Clause 44. The apparatus of clause 42 wherein the two or more of the plurality of positioning reference signals received within the period of time are received in different slots.

Clause 45. The apparatus of clause 42 wherein the two or more of the plurality of positioning reference signals received outside the period of time are received in different slots.

Clause 46. An apparatus, comprising:
a memory;
at least one transceiver;
at least one processor communicatively coupled to the memory and the at least one transceiver, and configured to:
receive a plurality of positioning reference signals, wherein each of the plurality of positioning reference signals is associated with a timing error group;
coherently combine resource elements for two or more of the plurality of positioning reference signals associated with a same timing error group; and
non-coherently combine resource elements for two or more of the plurality of positioning reference signals associated with different timing error groups.

Clause 47. The apparatus of clause 46 wherein the at least one processor is further configured to determine a reference signal received power measurement value based on a combination of two or more of the plurality of positioning reference signals.

Clause 48. The apparatus of clause 47 wherein the at least one processor is further configured to determine a position estimate based at least in part on the reference signal received power measurement value.

Clause 49. The apparatus of clause 47 wherein the at least one processor is further configured to report the reference signal received power measurement value to a network server.

Clause 50. The apparatus of clause 46 wherein the at least one processor is further configured to receive assistance data indicating timing error group information for each of the plurality of positioning reference signals.

Clause 51. An apparatus, comprising:
a memory;
at least one transceiver,
at least one processor communicatively coupled to the memory and the at least one transceiver, and configured to:
receive assistance data including a plurality of positioning reference signal resources;
determine two or more of the plurality of positioning reference signal resources to contribute to a combined signal measurement based at least in part on the assistance data; and
obtain a combined measurement value for two or more positioning reference signals.

Clause 52. The apparatus of clause 51 wherein the two or more positioning reference signals are transmitted in a slot, and the at least one processor is further configured to obtain the combined measurement value with a coherent combination of the two or more positioning reference signals.

Clause 53. The apparatus of clause 51 wherein the two or more positioning reference signals are associated with a timing error group, and the at least one processor is further configured to obtain the combined measurement value with a coherent combination of the two or more positioning reference signals.

Clause 54. The apparatus of clause 51 wherein the two or more positioning reference signals are transmitted in different slots, and the at least one processor is further configured to obtain the combined measurement value with a non-coherent combination of the two or more positioning reference signals.

Clause 55. The apparatus of clause 51 wherein the two or more positioning reference signals are associated with different timing error groups, and the at least one processor is further configured to obtain the combined measurement value with a non-coherent combination of the two or more positioning reference signals.

Clause 56. The apparatus of clause 51 wherein the combined measurement value is reference signal received power measurement value based on the two or more positioning reference signals.

Clause 57, The apparatus of clause 51 wherein the at least one processor is further configured to provide one or more measurement reports based at least in part on the combined measurement value.

Clause 58. The apparatus of clause 57 wherein the two or more positioning reference signals includes a first positioning reference signal and a second positioning reference signal, and the at least one processor is further configured to provide a first report associated with the first positioning reference signal and a second report associated with the second positioning reference signal, wherein both the first report and the second report include the combined measurement value.

Clause 59. The apparatus of clause 57 wherein the two or more positioning reference signals includes a first positioning reference signal and a second positioning reference signal, and the at least one processor is further configured to provide a first report associated with the first positioning reference signal and a second report associated with the second positioning reference signal, wherein the first report includes a first measurement value associated with the first positioning reference signal and the combined measurement value, and the second report includes a second measurement value associated with the second positioning reference signal and the combined measurement value.

Clause 60. The apparatus of clause 57 wherein the one or more measurement reports includes an indication that the combined measurement value is based on a coherent combination or a non-coherent combination of the two or more positioning reference signals.

Clause 61. The apparatus of clause 51 wherein the at least one processor is further configured to provide one or more capabilities messages to a network server indicating a number of positioning reference signal resources a wireless node is capable of combining.

Clause 62. The apparatus of clause 51 wherein the assistance data includes an indication to combine positioning reference signal resources received from different positioning reference signal resource sets, different transmission/reception points, or different positioning frequency layers.

Clause 63. The apparatus of clause 51 wherein the assistance data includes an indication of one or more timing error groups and the at least one processor is further configure to determine the two or more of the plurality of positioning reference signal resources to contribute to the combined signal measurement based at least in part on the indication of one or more timing error groups.

Clause 64. The apparatus of clause 51 wherein the assistance data includes an indication of a maximum number of positioning reference signal resources to be combined within a positioning reference signal resource set, a transmission/reception point, or a positioning frequency layer.

Clause 65. An apparatus, comprising:
a memory;
at least one transceiver;
at least one processor communicatively coupled to the memory and the at least one transceiver, and configured to:
determine two or more positioning reference signal resources to contribute to a combined positioning reference signal measurement; and
provide assistance data including an indication of the two or more positioning reference signal resources to contribute to the combined positioning reference signal measurement.

Clause 66. The apparatus of clause 65 wherein the at least one processor is further configured to determine the two or more positioning reference signal resources to contribute to the combined positioning reference signal measurement based at least in part on the two or more positioning reference signal resources being in a same slot.

Clause 67. The apparatus of clause 65 wherein the at least one processor is further configured to determine the two or more positioning reference signal resources to contribute to the combined positioning reference signal measurement based at least in part on the two or more positioning reference signal resources being in different slots.

Clause 68. The apparatus of clause 65 wherein the at least one processor is further configured to determine the two or more positioning reference signal resources to contribute to the combined positioning reference signal measurement based at least in part on the two or more positioning reference signal resources being in a same timing error group.

Clause 69. The apparatus of clause 35 wherein the at least one processor is further configured to determine the two or more positioning reference signal resources to contribute to the combined positioning reference signal measurement based at least in part on determining the two or more positioning reference signal resources being in different timing error groups.

Clause 70. The apparatus of clause 35 wherein the at least one processor is further configured to receive a measurement report indicating that the two or more positioning reference signal resources were not combined.

Clause 71. An apparatus for combining positioning reference signal resources, comprising:
means for receiving a plurality of positioning reference signals associated with a positioning reference signal resource set or a transmission/reception point;
means for coherently combining resource elements for two or more of the plurality of positioning reference signals received within a period of time; and
means for non-coherently combining resource elements for two or more of the plurality of positioning reference signals received outside of the period of time.

Clause 72. An apparatus for combining positioning reference signal resources, comprising:
means for receiving a plurality of positioning reference signals, wherein each of the plurality of positioning reference signals is associated with a timing error group;
means for coherently combining resource elements for two or more of the plurality of positioning reference signals associated with a same timing error group; and
means for non-coherently combining resource elements for two or more of the plurality of positioning reference signals associated with different timing error groups.

Clause 73. An apparatus for combining positioning reference signal resources, comprising:
means for receiving assistance data including a plurality of positioning reference signal resources;
means for determining two or more of the plurality of positioning reference signal resources to contribute to a combined signal measurement based at least in part on the assistance data; and
means for obtaining a combined measurement value for two or more positioning reference signals.

Clause 74. An apparatus for providing assistance data to enable combining of positioning reference signals, comprising:
means for determining two or more positioning reference signal resources to contribute to a combined positioning reference signal measurement; and
means for providing the assistance data including an indication of the two or more positioning reference signal resources to contribute to the combined positioning reference signal measurement.

Clause 75. A non-transitory processor-readable storage medium comprising processor-readable instructions configured to cause one or more processors to combine positioning reference signal resources, comprising code for:
receiving a plurality of positioning reference signals associated with a positioning reference signal resource set or a transmission/reception point;
coherently combining resource elements for two or more of the plurality of positioning reference signals received within a period of time; and
non-coherently combining resource elements for two or more of the plurality of positioning reference signals received outside of the period of time.

Clause 76. A non-transitory processor-readable storage medium comprising processor-readable instructions configured to cause one or more processors to combine positioning reference signal resources, comprising code for:
receiving a plurality of positioning reference signals, wherein each of the plurality of positioning, reference signals is associated with a timing error group;
coherently combining resource elements for two or more of the plurality of positioning reference signals associated with a same timing error group; and
non-coherently combining resource elements for two or more of the plurality of positioning reference signals associated with different timing error groups.

Clause 77. A non-transitory processor-readable storage medium comprising processor-readable instructions configured to cause one or more processors to combine positioning reference signal resources, comprising code for:
receiving assistance data including a plurality of positioning reference signal resources;
determining two or more of the plurality of positioning reference signal resources to contribute to a combined signal measurement based at least in part on the assistance data; and
obtaining a combined measurement value for two or more positioning reference signals.

Clause 78. A non-transitory processor-readable storage medium comprising processor-readable instructions configured to cause one or more processors to provide assistance data to enable combining of positioning reference signals, comprising code for:
determining two or more positioning reference signal resources to contribute to a combined positioning reference signal measurement; and providing the assistance data including an indication of the two or more positioning reference signal resources to contribute to the combined positioning reference signal measurement.

The invention claimed is:

1. A method for combining positioning reference signal resources, comprising:
receiving a plurality of positioning reference signals associated with a positioning reference signal resource set or a transmission/reception point;
coherently combining resource elements for two or more of the plurality of positioning reference signals received within a slot of a subframe; and
non-coherently combining resource elements for two or more of the plurality of positioning reference signals received in different slots of the subframe, the different slots being different from the slot of the subframe.

2. The method of claim 1 further comprising determining a reference signal received power measurement value based on a combination of two or more of the plurality of positioning reference signals.

3. The method of claim 2 further comprising determining a position estimate based at least in part on the reference signal received power measurement value.

4. The method of claim 2 further comprising reporting the reference signal received power measurement value to a network server.

5. The method of claim 1 further comprising reporting one or more reference signal received power measurement values including a first reference signal received power measurement based on a single positioning reference signal or a second reference signal received power measurement based on a combination of two or more of the plurality of positioning reference signals.

6. An apparatus, comprising:
a memory;
at least one transceiver;
at least one processor communicatively coupled to the memory and the at least one transceiver, and configured to:
receive a plurality of positioning reference signals associated with a positioning reference signal resource set or a transmission/reception point;
coherently combine resource elements for two or more of the plurality of positioning reference signals received within a slot of a subframe; and
non-coherently combine resource elements for two or more of the plurality of positioning reference signals received different slots of the subframe, the different slots being different from the slot of the subframe.

7. The apparatus of claim 6 wherein the at least one processor is further configured to determine a reference signal received power measurement value based on a combination of two or more of the plurality of positioning reference signals.

8. The apparatus of claim 7 wherein the at least one processor is further configured to determine a position estimate based at least in part on the reference signal received power measurement value.

9. The apparatus of claim 7 wherein the at least one processor is further configured to report the reference signal received power measurement value to a network server.

10. The apparatus of claim 6 wherein the at least one processor is further configured to report one or more reference signal received power measurement values including a first reference signal received power measurement based on a single positioning reference signal or a second reference signal received power measurement based on a combination of two or more of the plurality of positioning reference signals.

11. An apparatus for combining positioning reference signal resources, comprising:
means for receiving a plurality of positioning reference signals associated with a positioning reference signal resource set or a transmission/reception point;
means for coherently combining resource elements for two or more of the plurality of positioning reference signals received within a slot of a subframe; and
means for non-coherently combining resource elements for two or more of the plurality of positioning reference signals received in different slots of the subframe, the different slots being different from the slot of the subframe.

12. A non-transitory processor-readable storage medium comprising processor-readable instructions configured to cause one or more processors to combine positioning reference signal resources, comprising code for:
receiving a plurality of positioning reference signals associated with a positioning reference signal resource set or a transmission/reception point;
coherently combining resource elements for two or more of the plurality of positioning reference signals received within a slot of a subframe; and
non-coherently combining resource elements for two or more of the plurality of positioning reference signals received different slots of the subframe, the different slots being different from the slot of the subframe.

* * * * *